(12) United States Patent　　(10) Patent No.: US 10,974,269 B2
Kawamori et al.　　(45) Date of Patent: Apr. 13, 2021

(54) NOZZLE DEFLECTION MEASURING DEVICE AND METHOD THEREOF

(71) Applicant: SUGINO MACHINE LIMITED, Uozu (JP)

(72) Inventors: Yoshiteru Kawamori, Uozu (JP); Toyoaki Mitsue, Uozu (JP); Tomio Sawasaki, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 0 days.

(21) Appl. No.: 16/931,991

(22) Filed: Jul. 17, 2020

(65) Prior Publication Data

US 2020/0346236 A1　　Nov. 5, 2020

Related U.S. Application Data

(63) Continuation of application No. 16/166,790, filed on Oct. 22, 2018, now Pat. No. 10,751,745.

(30) Foreign Application Priority Data

Jan. 26, 2018　(JP) ................ JP2018-011119

(51) Int. Cl.
　　*G01B 11/24*　　(2006.01)
　　*B05B 15/14*　　(2018.01)
　　(Continued)

(52) U.S. Cl.
　　CPC .............. *B05B 15/14* (2018.02); *B05B 15/16* (2018.02); *G01B 11/14* (2013.01); *G01B 11/16* (2013.01); *G01M 99/008* (2013.01)

(58) Field of Classification Search
　　CPC ....... G01B 11/24; G01B 11/25; G01B 11/306; G01B 11/245; G06T 7/0057
　　(Continued)

(56) References Cited

U.S. PATENT DOCUMENTS

2002/0116758 A1　8/2002　Ito et al.
2007/0258781 A1　11/2007　Nishizaki et al.
(Continued)

FOREIGN PATENT DOCUMENTS

JP　　H05-154800 A　　6/1993
JP　　H05-051464 U　　7/1993
(Continued)

OTHER PUBLICATIONS

Office Action dated Nov. 4, 2020, in a corresponding Japanese Patent Application No. 2018-011119 (6 pages).

*Primary Examiner* — Md M Rahman
(74) *Attorney, Agent, or Firm* — United IP Counselors, LLC

(57) ABSTRACT

The nozzle deflection measuring device includes: a nozzle that rotates about a rotation axis, and includes a cylindrical shaft body extending along the rotation axis, and a spout located at a distal end portion of the shaft body a tank-shaped container having an insertion opening, the insertion opening having a radius larger than a sum of a radius of the shaft body and a maximum allowable deflection amount of the nozzle, a folded back portion arranged entire circumference of the insertion opening and extending inward of the container, and a discharge port; a moving mechanism that moves the nozzle relative to the container; and a non-contact deflection measuring meter arranged outside of the container and in the vicinity of the insertion opening, and measures a deflection of the nozzle inserted through the insertion opening in a state where the spout is disposed inside the container.

7 Claims, 4 Drawing Sheets

(51) Int. Cl.
  *G01M 99/00* (2011.01)
  *B05B 15/16* (2018.01)
  *G01B 11/16* (2006.01)
  *G01B 11/14* (2006.01)

(58) Field of Classification Search
  USPC .......................................................... 356/601
  See application file for complete search history.

(56) References Cited

U.S. PATENT DOCUMENTS

| | | |
|---|---|---|
| 2009/0255560 A1 | 10/2009 | Lehmann et al. |
| 2010/0012746 A1 | 1/2010 | Zur |
| 2011/0074870 A1 | 3/2011 | Maida |
| 2014/0350209 A1 | 11/2014 | Nemoto et al. |
| 2015/0325463 A1 | 11/2015 | Katsuragawa et al. |
| 2017/0059299 A1 | 3/2017 | Safrani et al. |
| 2017/0347826 A1 | 12/2017 | Popa et al. |

FOREIGN PATENT DOCUMENTS

| | | |
|---|---|---|
| JP | H09-216157 A | 8/1997 |
| JP | 2005-059016 A | 3/2005 |
| JP | 2009-078313 A | 4/2009 |
| JP | 5432943 B2 | 3/2014 |
| JP | 2016-130040 A | 7/2016 |
| JP | 6147623 B2 | 6/2017 |
| JP | 6196588 B2 | 9/2017 |

NOZZLE DEFLECTION MEASURING DEVICE AND METHOD THEREOF

CROSS-REFERENCE TO RELATED APPLICATIONS

This application is a continuation of application Ser. No. 16/166,790, filed on Oct. 22, 2018, which claims the benefit of priority to Japanese Patent Application No. 2018-011119, filed on Jan. 26, 2018, the entire contents of which are hereby incorporated by reference.

BACKGROUND

1. Technical Field

The present invention relates to a nozzle deflection measuring device and nozzle deflection measuring method.

2. Description of the Background

One known device impinges a high pressure jet on a component to deburr or clean the component. In this device, a nozzle is inserted into a hole in the component, and a high-pressure jet jetted from the nozzle impinges on a burr generated in the hole to clean the component.

BRIEF SUMMARY

The deflection of the nozzle becomes large during the ejection of the high-pressure jet, then, the nozzle may collide with the wall surface of the hole. When a nozzle collides with a wall surface, a component may be damaged. In addition, the nozzle that collide with the wall surface may cause the nozzle to break. Further, the deflection of the nozzle becomes large, then, the nozzle may collide with a component or a jig.

The present invention provides to measure the deflection of a nozzle at the time of jetting to prevent the nozzle from colliding with a component or a jig and to prevent damage to the nozzle or the component.

One or more aspects of the present invention provides a nozzle deflection measuring device, including:
  a nozzle configured to rotate about a rotation axis, the nozzle including
    a cylindrical shaft body extending along the rotation axis, and
    a spout located at a distal end portion of the shaft body;
  a tank-shaped container having
    an insertion opening for the spout to be inserted, the insertion opening having a radius larger than a sum of a radius of the shaft body and a maximum allowable deflection amount of the nozzle,
    a folded back portion arranged entire circumference of the insertion opening, the folded back portion extending inward of the container, and
    a discharge port;
  a moving mechanism configured to move the nozzle relative to the container, and
  a non-contact deflection measuring meter arranged outside of the container and in the vicinity of the insertion opening, the deflection measuring meter configured to measure a deflection of the nozzle inserted through the insertion opening in a state where the spout is disposed inside the container.

According to the embodiments, the deflection of the nozzle at the time of ejection is measured efficiency.

DETAILED DESCRIPTION

First Embodiment

Figure 1:
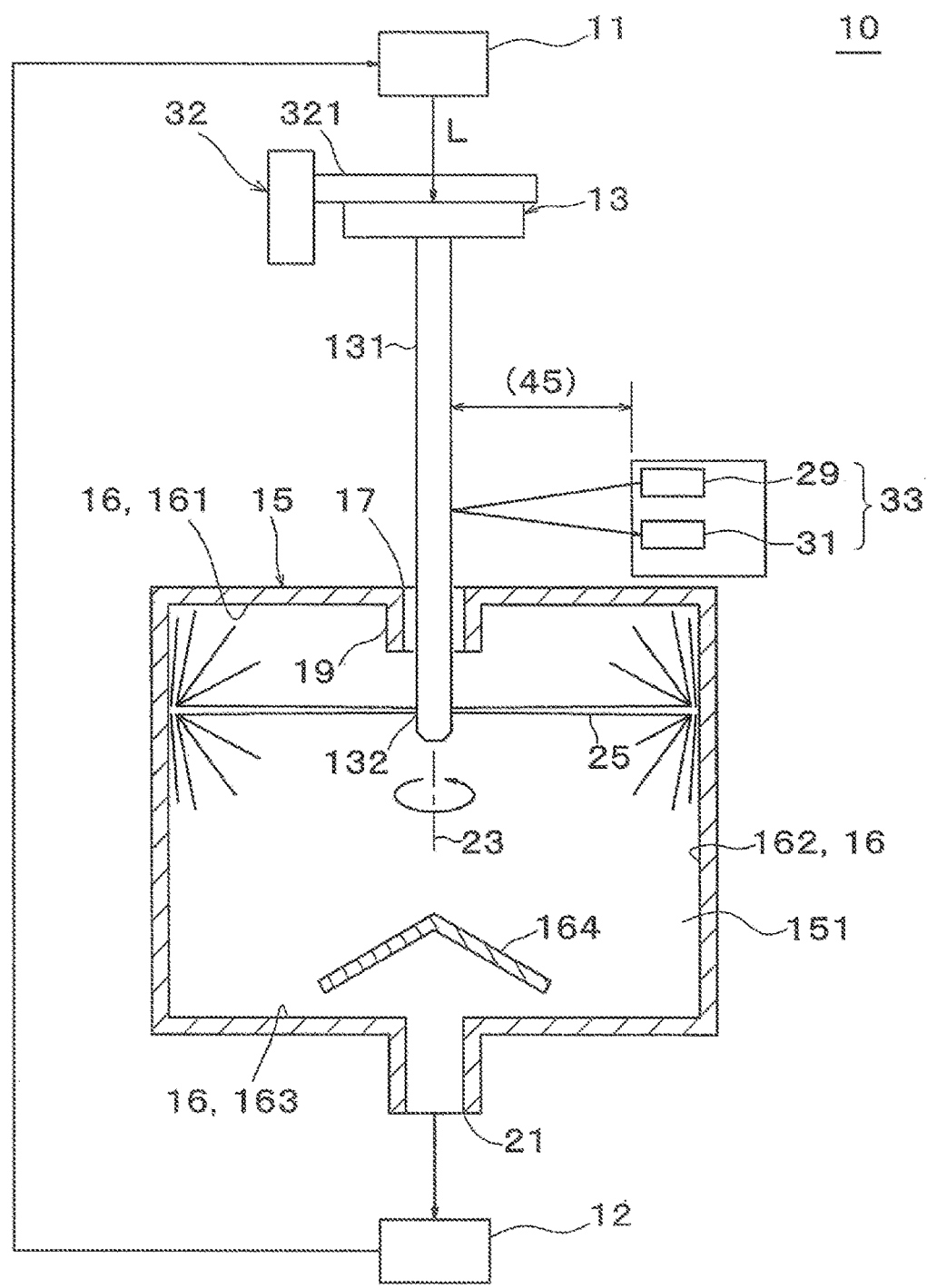
FIG. 1 is a nozzle deflection measuring device according to a first embodiment.

The first embodiment will be described with reference to the drawings. As shown in FIG. 1, the nozzle deflection measuring device 10 of the present embodiment includes a pump 11, a nozzle 13, an ejection container 15, a moving mechanism 32, and a displacement meter 33 that measures deflection. The measuring device 10 may include a tank 12.

The measuring device 10 of the present embodiment can be applied to a washing machine (including a deburring device; hereinafter the same) including the pump 11, the nozzle 13, the tank 12, and the moving mechanism 32. For example, washing machines disclosed in Japanese Patent Nos. 5,432,943, 6,147,623, and 6,196,588 may be utilized. These are sold by the applicant as JCC series washing machines.

The pump 11 boosts the pressure of the liquid L. The pump 11 delivers the liquid L to the nozzle 13. The pump 11 is, for example, a centrifugal pump or a metering pump. Piston pumps and gear pumps can be used as metering pumps. The pump 11 preferably has a discharge pressure of between 2 and 250 MPa, inclusive.

The liquid L is stored in the tank 12. The liquid L may be pumped from the tank 12 by the pump 11 and ejected from the nozzle 13. The liquid L returns to the tank 12. The tank 12 may have a filtration device.

The nozzle 13 includes a shaft body 131 and a spout 132. The shaft body 131 extends along the rotation axis 23. The shaft body 131 has a cylindrical shape. The shaft body 131 has a channel (not shown) for allowing the liquid L to flow to the spout 132. The spout 132 is provided at a distal end portion of the shaft body 131. The spout 132 is provided perpendicularly to the rotation axis 23 or inclined from the rotation axis 23. A plurality of spouts 132 may be provided. When a plurality of spouts 132 are provided, they are preferably evenly arranged circumferential direction about the rotation axis 23. The nozzle 13 rotates about a rotation axis 23. The nozzle 13 is, for example, a lance, a fan-shaped nozzle, a direct-ejection nozzle, or an L-shaped nozzle.

The moving mechanism 32 moves the nozzle 13 relative to the container 15. The moving mechanism 32 supports the nozzle 13. The moving mechanism 32 is, for example, a vertical articulated robot, a scalar robot, an orthogonal axis robot, a parallel link robot, or a moving column and a carriage. The moving mechanism 32 is controlled by a numerical controller, not shown. The moving mechanism 32 may include a turret 321. The turret 321 can support a plurality of nozzles 13. The turret 321 supplies the liquid L to one of the plurality of nozzles 13.

The moving mechanism 32 may support the container 15. In this case, the rotation axis 23 of the nozzle 13 is fixed. The moving mechanism 32 moves the container 15 with respect to the rotation axis 23.

The container 15 has an insertion opening 17, a folded back portion 19, a wall surface 16, and a discharge port 21. The container 15 may have a cone 164.

The container 15 is a tank-shaped container, and has an ejection space 151 inside. The container 15 has, for example, a cylindrical or cube-shaped outer shape. The ejection container 15 is resistant to corrosion for the liquid L and has a strength such that it is not easily damaged by jet flows from the nozzle 13. The material of the container 15 is, for example, a plate material of stainless steel or iron. The wall thickness of the container 15 is, for example, 1 mm to 3 mm, inclusive.

The wall surface 16 is an inner surface of the container 15. The wall surface 16 has at least a first surface 161 provided with the opening 17 and a second surface 162 surrounding the periphery of the first surface 161. A third surface 163 facing the first surface 161 may be provided. The first surface 161, the second surface 162, and the third surface 163 are connected to each other to form the wall surface 16. The wall 16 may be provided with a blocking plate (not shown) against which the jet 25 collides. The blocking plate is replaceable.

The opening 17 is preferably provided on the upper surface of the container 15. The opening 17 is preferably circular. The opening 17 is larger than the cross section of the shaft body 131. The opening 17 is preferably slightly larger than the cross-section of the shaft body 131. For example, the radius of the opening 17 is the sum of the radius of the cross section of the shaft body 131 and the maximum allowable deflection amount of the nozzle.

A folded back portion 19 is provided inside the opening 17. The folded back portion 19 is provided on the entire circumference of the opening 17. The portion 19 preferably extend substantially perpendicularly from first surface 161. The folded back portion 19 may be a thin hollow cylinder. The portion 19 may have a circular cross-section and form a hollow truncated cone whose outer surface increases in large-diameter with distance from the first surface. The length of the portion 19 is, for example, 1 to 3 times the diameter of the opening 17, inclusive. The folded back portion 19 may be bent radially toward outside of opening 17 at the distal end portion.

The jet 25 generated from the spout 132 inside the container 15 rebounds on the wall surface 16 and scatters in the space 151. The folded back portion 19 rebounds the liquid L scattered toward the surface 161 or the insertion opening 17. The folded back portion 19 prevent the liquid L scattered in the injection space 151 from splashing out from the opening 17.

The discharge port 21 is provided at the lower portion of the container 15 in the vertical direction. The discharge port 21 discharges the liquid L jetted to the inside of the container 15 to the outside of the container 15.

The cone 164 is disposed on an extension of the insertion opening. The cone 164 has a conical surface whose outer surface has larger diameter as it moves away from the insertion opening. When the cone 164 is arranged, the nozzle 13 having the spout 132 in the direction of the rotation axis 23 can be used. The jet 25 generated in the direction of the rotation axis 23 impinges on the cone 164 and rebounds in a direction different from that of the rotation axis 23. The rebounded jet flow does not splash in the direction of the opening 17, but impinges on the wall 16 or the portion 19.

Instead of arranging the cone 164, the surface 163 may be inclined with respect to the rotation axis 23. At this time, the jet 25 generated in the direction of the rotation axis 23 impinges on the surface 163 and rebounds in a direction different from that of the rotation axis 23.

The displacement meter 33 has a light emitter 29 and a light receiver 31. The emitter 29 emits a light beam toward the nozzle 13 inserted into the opening 17. The receiver 31 receives the beam reflected by the surface of the shaft body 131. The displacement meter 33 is, for example, a triangulation type displacement meter or a time-of-flight type displacement meter. Here, the displacement meter 33 of the triangulation system converts the imaging position of the photodetector 31 due to the distance change into a distance by using a PSD (position detecting element) or a C-MOS sensor as the photodetector 31. The time-of-flight type displacement meter 33 measures a short time from the irradiation of light from the emitter 29 to the reception of light by the receiver 31, and converts the time difference into a distance.

The displacement meter 33 may be a contact type, but a non-contact displacement meter 33 is more preferable.

Figure 2:
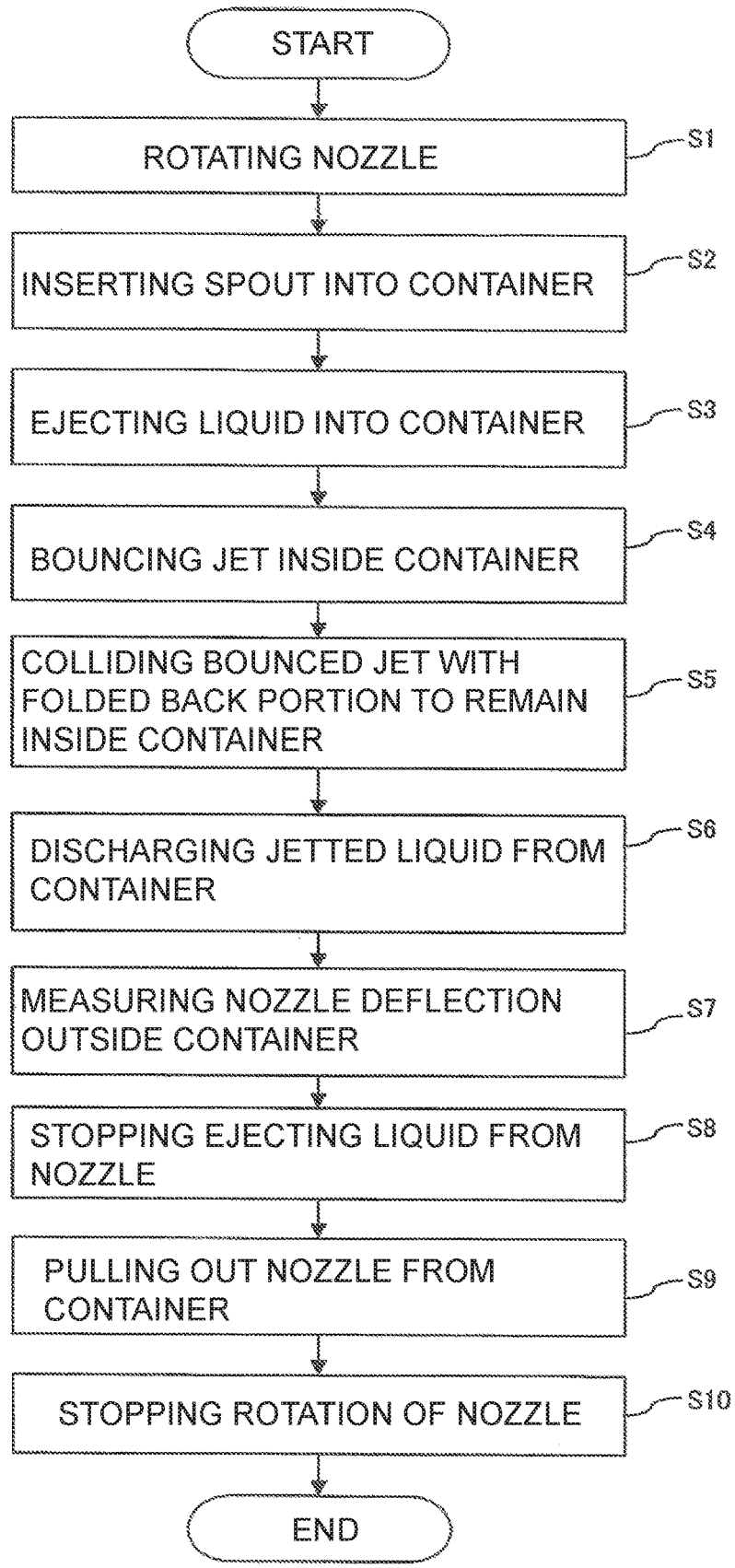
FIG. 2 is a flow chart of a method of measuring nozzle deflection.

Next, referring to FIG. 2, a procedure for measuring the deflection of the nozzle 13 will be described. First, the nozzle 13 rotates (S1). The injection spout 132 is inserted into the container 15 (S2). The nozzle 13 injects the liquid L into the container 15 (S3). The jet 25 rebounds from the wall 16 inside the container 15 (S4). The jet 25 bounced off the wall 16 impinges on the portion 19 and remains inside the container 15 (S5). The jetted liquid L is discharged from the container 15 (S6). The deflection of the nozzle 13 is measured outside the container 15 (S7). Next, the nozzle 13 stops jetting the liquid L (S8). The nozzle 13 is pulled out of the container 15 (S9). The rotation of the nozzle is stopped (S10).

Next, each step will be described in detail with reference to FIGS. 1 and 2. In step S1, the moving mechanism 32 rotates the nozzle 13. The nozzle 13 rotates about a rotation axis 23.

In step S2, the moving mechanism 32 firstly moves the nozzle 13 with respect to the container 15 so that the center of the opening 17 is positioned on the extension line of the rotation axis 23. Next, the moving mechanism 32 moves the nozzle 13 toward the container 15 along the rotation axis 23. Then, the moving mechanism 32 inserts the distal end of the nozzle 13 into the container 15. At this time, the spout 132 is positioned farther from the first surface 161 than the distal end of the portion 19.

In step S3, the pump 11 supplies the liquid L to the nozzle 13. Then, the nozzle 13 ejects the liquid L as the jet 25 from the spout 132. The nozzle 13 generates a jet 25 inside the container 15, that is, in the space 151.

The order of steps S1 to S3 may be changed. However, when the displacement meter 33 can be damaged by the collision of the jet 25, step S3 is executed after steps S1 and S2.

In step S4, the jet 25 travels in the jetting direction until it impinges on the wall surface 16. Then, the jet 25 impinges on the wall surface 16 and rebounds. Part of the jet 25 spreads along the wall surface 16, and the remainder scatters into the space 151.

When the container 15 is cylindrical or cubic and generates the jet 25 substantially perpendicular to the rotation axis 23, the jet 25 impinging on the second surface 162 spreads partially along the second surface 162, and impinges on the first surface 161 or the third surface 163 again. A portion of the liquid L that impinges on the first surface 161 further spreads along the first surface 161. The remainder of the liquid L that has impinged on the first surface 161 rebounds at the first surface 161 and scatters in the ejection space 151.

If the container 15 is cylindrical or cubic and is inclined to the base end side of the nozzle 13 with respect to a perpendicular plane of the rotation axis 23 to generate the jet 25, the jet 25 may collide with the first surface 161. In this case, a part of the jet 25 spreads along the first surface 161, and the remainder scatters in the space 151.

When the jet 25 is generated along the rotation axis 23, the jet 25 impinges on the cone 164. A portion of the jet 25 impinging on the cone 164 spreads along the surface of the cone 164 and impinges on the third surface 163 again. A portion of the jet 25 impinging on the third surface 163 spreads along the third surface 163 and impinges on the second surface 162. The remainder of the jet 25 impinging on the cone 164 rebounds at the surface of the cone 164 and scatters inside the injection space 151. In addition, a part of the jet 25 that has collided with the second surface 162 rebounds at the second surface 162, and scatters inside the space 151.

Regardless of the direction of the jet 25 and the shape of the injection space 151, a part of the jet 25 impinges on the wall surface 16 and spreads along the wall surface 16, and the remainder scatters inside the space 151. A portion of the jet 25 flows along the first surface 161, and a portion bounces back by the wall surface 16 to randomly scatter within the space 151. Part of the rebounded jet 25 becomes mist and fills the space 151.

When the pressure of the jet 25 is 2 MPa or more, rebound of the jet 25 on the wall surface 16 or misting of the rebound jet 25 tends to occur, and therefore, in particular, the method of measuring the deflection of the nozzle according to the present embodiment can be suitably used.

In step S5, the jet 25 rebounded by the wall surface 16 and the liquid L spreading along the first surface 161 collide with the portion 19. The rebounded jet 25 impinges on the portion 19 and is returned to the interior of the space 151. Most of the liquid L scattered in the ejection space 151 impinges on the portion 19 and remains inside the ejection container 15 without splashing out of the opening 17.

A part of the liquid L that has collided with the wall surface 16 becomes a mist, rides on the bounced jet or the surrounding air flow, and flows into the space 151. Most of the misted liquid L also remains inside the container 15 without flowing out of the opening 17.

When the gap between the inserted shaft body 131 and the portion 19 is small, the resistance of the fluid flowing through the gap between the portion 19 and the shaft body 131 becomes large, and the jet 25 bounced by the wall surface 16 and the mist can be prevented from being discharged from the opening 17.

In step S6, the liquid L jetted from the spout 132 is discharged from the discharge port 21. The liquid L returns to the tank 12. Preferably, the liquid L is discharged by gravity.

In step S7, the deflection of the nozzle 13 is measured outside the container 15. Preferably, the deflection of the nozzle 13 is measured in a non-contact manner. For example, the displacement meter 33 using a laser measures the distance 45 from the fixed point to the surface of the shaft body 131 over time. The displacement meter 33 measures the difference between the maximum value and the minimum value of the distance 45 as the deflection.

Figure 3:
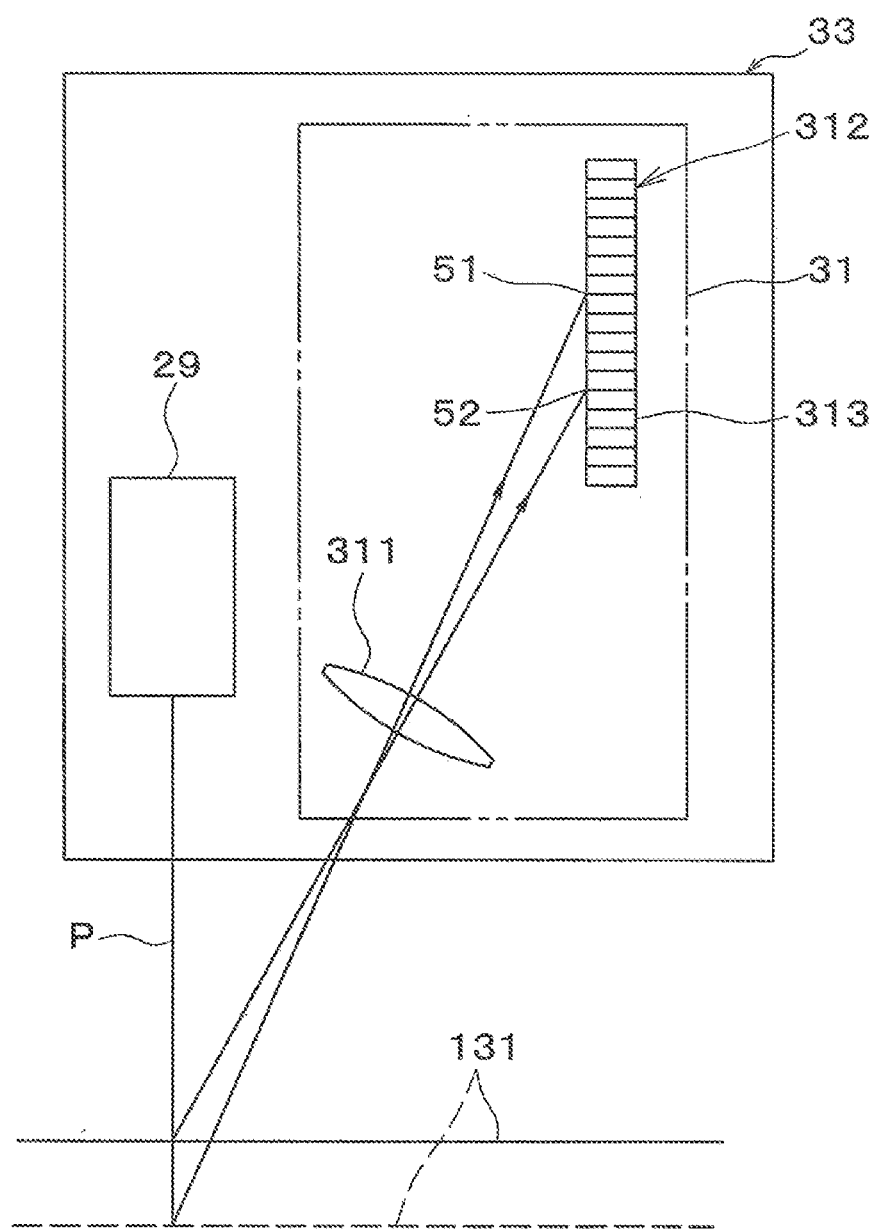
FIG. 3 is a schematic configuration diagram showing an example of a displacement meter according to the first embodiment.

Referring to FIG. 3, the distance measurement method by the triangulation method will be described. The light receiver 31 includes a light receiving lens 311 and a light receiving element 312. The light receiving element 312 may include a plurality of pixels 313. The laser P emitted from the emitter 29 is reflected by the surface of the shaft body 131. The reflected laser P passes through the light receiving lens 311 and reaches the light receiving element 312. Here, the position in the light receiving element 312 to which the laser P reaches changes depending on the position of the shaft body 131. When the distance 45 is long, the laser P reaches a position 51 relatively far from the shaft body 131. When the distance 45 is close, the laser P reaches a position 52 relatively close to the shaft body 131. The triangulation displacement meter 33 calculates the difference between the maximum value and the minimum value of the distance 45 according to the position of the pixel 313 that has received the laser P in the light receiving element 312.

Next, referring to FIG. 1, the distance measurement method by the time-of-flight method will be described. For example, the emitter 29 irradiates the shaft body 131 with continuously amplitude modulated laser. The time T elapses until the light is reflected by the shaft body 131 and received by the light receiver 31. Then, a phase difference occurs between the projected laser P and the received laser P. The difference between the maximum value and the minimum value of the distance 45 is calculated from the phase difference.

The laser is scattered by mist or jet flow scattering. So, the scattering of the mist or the jet flow hinders the measurement of the deflection of the nozzle 13 by the laser. However, according to the present embodiment, most of the jet 25 rebounded by the wall surface 16 and the mist generated by the jet 25 do not splash out from the opening 17, so that the deflection of the nozzle 13 during the ejection of the liquid L can be measured.

For example, in a contact-type deflection measuring method using a cylinder, the nozzle 13 receives a force from a measuring element. Therefore, the deflection of the nozzle 13 cannot be accurately measured. According to the present embodiment, since the deflection of the nozzle 13 is measured by the non-contact deflection measuring meter, it is possible to measure the deflection of the nozzle 13 accurately during the ejection.

Steps S4 to S7 can be performed simultaneously. Steps S4 to S6 are performed continuously. Step S7 is executed while steps S4 to S6 are performed. Step S7 can be executed in a part of the time period during which steps S4 to S6 are performed.

In step S8, the pump 11 stops the supply of the liquid L to the nozzle 13. Then, the nozzle 13 stops the ejection.

In step S9, the moving mechanism 32 pulls out the nozzle 13 from the container 15 along the rotation axis 23. When the end of the nozzle 13 comes out of the container 15 from the opening 17, the moving mechanism 32 can freely move the nozzle 13. The moving mechanism 32 may move either the nozzle 13 or the container 15.

In step S10, the moving mechanism 32 stops the rotation of the nozzle 13.

The order of steps S8 to S10 may be interchanged. Steps S8 to S10 can be executed simultaneously. However, in order to prevent the displacement meter 33 from being damaged by the collision of the jet 25, it is preferable that the step S8 is performed prior to the steps S9 and S10.

Second Embodiment

Figure 4:
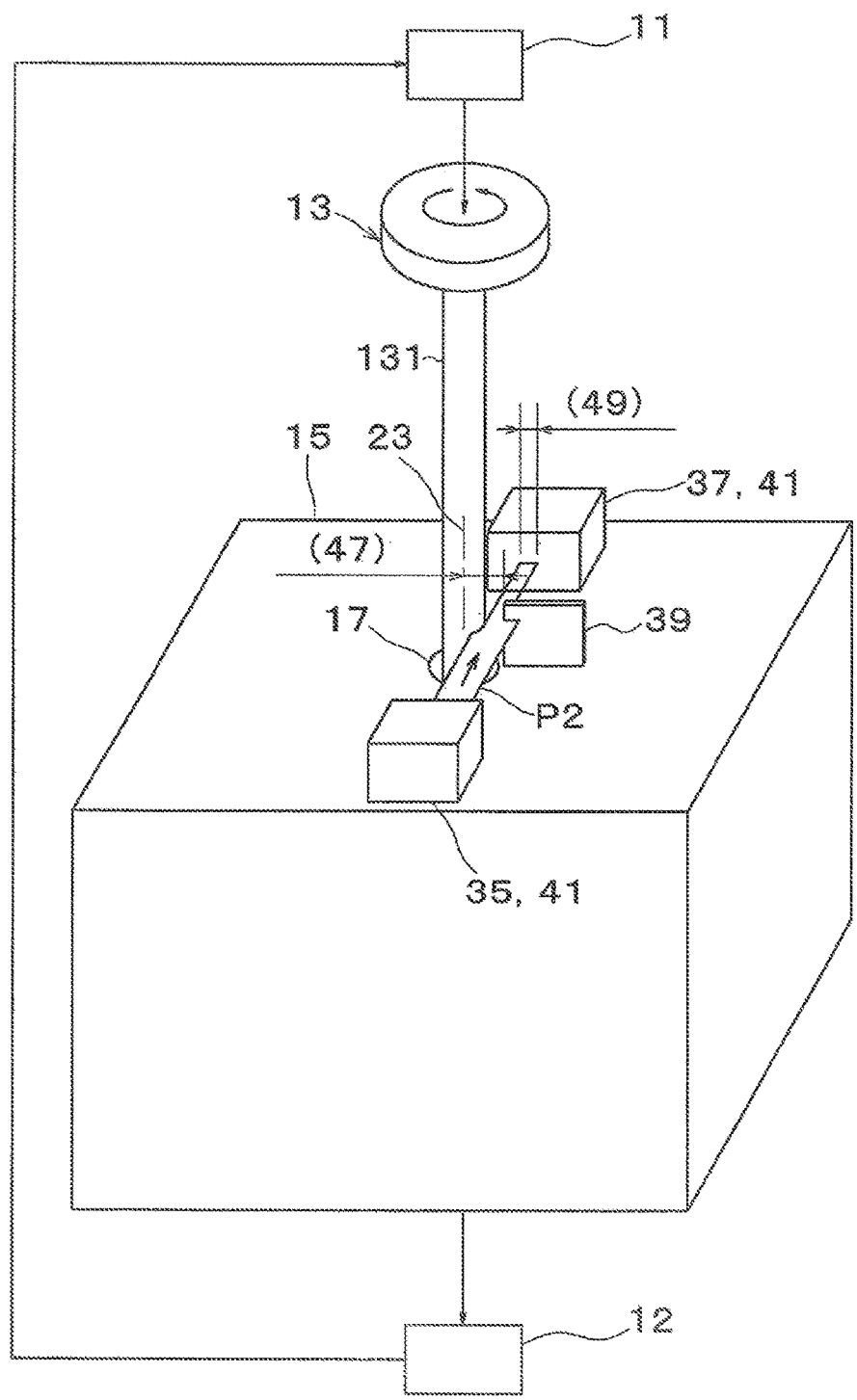
FIG. 4 is a nozzle deflection measuring device according to a second embodiment.

Next, referring to FIG. 4, a nozzle deflection measuring device 100 according to the second embodiment will be described. The measuring device 100 includes the pump 11, a nozzle 13, the container 15, a deflection measuring meter, and the tank 12. The deflection measuring meter includes a light shielding plate 39 and a passing light width measuring device 41. The measuring device 100 of the present embodiment is the same as the measuring device 10 of the first embodiment except that a light shielding plate 39 and a passing light width measuring device 41 are provided instead of the displacement meter 33.

The light shielding plate 39 is fixed to the outside of the container 15 and in the vicinity of the opening 17. The light shielding plate 39 can be fixed to the container 15. Preferably, the light shielding plate 39 is provided on a plane passing through the rotation axis 23 of the shaft body 131 inserted into the opening 17. The light shielding plate 39 is fixed apart from the rotation axis 23 of the shaft body 131 inserted into the opening 17 by a distance 47. Here, the distance 47 is the sum of the radius of the shaft body 131, the allowable deflection amount of the nozzle 13, and the safety gap. The safety gap is a small gap provided so that the nozzle 13 and the light shielding plate 39 do not collide with each other. The safety gap is, for example, 0.5 to 1 mm.

The passing light width measuring device 41 includes a light emitter 35 and a light receiver 37. The emitter 35 emits a laser beam P2 between the shaft body 131 and the light shielding plate 39. The width of the laser P2 is larger than the distance between the shaft body 131 and the light shielding plate 39. One end of the projected laser P2 is blocked by the shaft body 131, and the other end is blocked by the light shielding plate 39. Only the middle portion of the laser P2 passes between the shaft body 131 and the light shielding plate 39. The receiver 37 receives the laser P2 that has passed between the shaft body 131 and the light shielding plate 39. The receiver 37 measures the passing width 49 of the received laser P2. The passing light width measuring device 41 obtains the deflection of the nozzle from the difference between the maximum value and the minimum value of the passing width 49 measured by the receiver 37.

The method of measuring the deflection of the nozzle of the present embodiment is the same as that of the first embodiment except for step S7. In step S7, as described above, the deflection of the nozzle 13 is measured by the deflection measuring meter having the light shielding plate 39 and the passing light width measuring device 41.

Instead of the passing light width measuring device 41 that includes a light shielding plate 39, and measures the width of the laser P2 passing between the shielding plate 39 and the nozzle 13, the laser P2 may pass through both sides of the nozzle 13 and the receiver 37 may receive light. In this case, the receiver 37 simultaneously measures the position and the width shielded by the nozzle 13. Then, the passing light width measuring device 41 calculates the deflection of the nozzle 13 from the amount of displacement of the light-shielded position.

The present invention is not limited to the embodiments described above, and various modifications are possible without departing from the gist of the present invention, and all technical matters included in the technical concept described in the claims are encompassed by the present invention. While specific embodiments have been described, those skilled in the art may practice various alternatives, modifications, alterations, or improvements from the disclosure described herein, and all such variations fall within the scope of the invention defined by the appended claims.

REFERENCE SIGNS LIST

10 Measurement device
13 Nozzle
15 Ejection container
17 Insertion opening
19 Folding back portion
21 Discharge port
33 Displacement meter (deflection measuring meter)
41 Pass width measuring device (deflection measuring meter)

What is claimed is:

1. A nozzle deflection measuring device, comprising:
   a nozzle configured to rotate about a rotation axis, the nozzle including
      a cylindrical shaft body extending along the rotation axis, and
      a spout located at a distal end portion of the shaft body;
   a tank-shaped container having
      an insertion opening for the spout to be inserted, the insertion opening having a radius larger than a sum of a radius of the shaft body and a maximum allowable deflection amount of the nozzle,
      a folded back portion arranged entire circumference of the insertion opening, the folded back portion extending inward of the container, and
      a discharge port;
   a moving mechanism configured to move the nozzle relative to the container, and
   a non-contact deflection measuring meter arranged outside of the container and in the vicinity of the insertion opening, the deflection measuring meter configured to measure a deflection of the nozzle inserted through the insertion opening in a state where the spout is disposed inside the container.

2. The nozzle deflection measuring device according to claim 1, wherein
   the deflection measuring meter includes,
      a light emitter configured to emit a laser toward the nozzle, and
      a light receiver configured to receive the laser reflected by the nozzle.

3. The nozzle deflection measuring device according to claim 2, wherein
   the deflection measuring meter calculates a difference between the maximum value and the minimum value of a distance from the light emitter to the nozzle.

4. The nozzle deflection measuring device according to claim 1, wherein
   the nozzle ejects liquid having a pressure of between 2 to 250 MPa from the spout inside the container.

5. The nozzle deflection measuring device according to claim 1, wherein
   the deflection measuring meter includes,
      a light shielding plate fixed in a vicinity of the insertion opening outside the container, and
      a passing light width measuring device including
         a light emitter configured to emit a laser between the shaft body and the light shielding plate, the laser having a width larger than a distance between the shaft body and the light shielding plate, and
         a light receiver configured to receive the laser passing between the shaft body and the light shielding plate.

6. The nozzle deflection measuring device according to claim 5, wherein
   the light shielding plate is fixed apart from the rotation axis by a distance that is a sum of a radius of the shaft body, allowable deflection amount of the nozzle, and a safety gap, the safety gap being a gap provided so that the nozzle and the light shielding plate do not collide with each other.

7. The nozzle deflection measuring device according to claim 5, wherein the passing light width measuring device obtains a deflection of the nozzle from a difference between a maximum value and a minimum value of a width of the laser passing between the shaft body and the light shielding plate.

* * * * *